US012664381B2

(12) United States Patent
Tramoni et al.

(10) Patent No.: US 12,664,381 B2
(45) Date of Patent: Jun. 23, 2026

(54) NFC ACCESSORY DETECTION WITHOUT MAGNETOMETER

(71) Applicant: STMicroelectronics International N.V., Geneva (CH)

(72) Inventors: Alexandre Tramoni, Le Beausset (FR); Remy Ferroul, Trets (FR)

(73) Assignee: STMicroelectronics International N.V., Geneva (CH)

( * ) Notice: Subject to any disclaimer, the term of this patent is extended or adjusted under 35 U.S.C. 154(b) by 0 days.

(21) Appl. No.: 18/830,266

(22) Filed: Sep. 10, 2024

(65) Prior Publication Data

US 2025/0111176 A1      Apr. 3, 2025

(30) Foreign Application Priority Data

Oct. 2, 2023    (FR) ................................. FR2310508

(51) Int. Cl.
| | |
|---|---|
| *G06K 7/10* | (2006.01) |
| *G06K 19/07* | (2006.01) |
| *G06K 19/077* | (2006.01) |

(52) U.S. Cl.
CPC ..... *G06K 7/10237* (2013.01); *G06K 19/0723* (2013.01); *G06K 19/07775* (2013.01)

(58) Field of Classification Search
CPC ........... G06K 7/10237; G06K 19/0723; G06K 19/07775; H04B 5/48
See application file for complete search history.

(56) References Cited

U.S. PATENT DOCUMENTS

| | | | |
|---|---|---|---|
| 10,632,317 B2 * | 4/2020 | Meskens ............ | A61N 1/37252 |
| 2011/0254637 A1 | 10/2011 | Manssen et al. | |
| 2014/0273836 A1 * | 9/2014 | Rizzo ....................... | H04B 5/73 455/41.1 |
| 2016/0006476 A1 * | 1/2016 | El-Rayis .................. | H04B 1/48 455/78 |

* cited by examiner

*Primary Examiner* — Sonji N Johnson
(74) *Attorney, Agent, or Firm* — Slater Matsil, LLP

(57) ABSTRACT

The present description relates to a mobile device comprising a near-field communication router and an antenna, coupled to the router via at least one impedance matching circuit between at least two impedance values. A first impedance value is selected to communicate with a near-field communication device of a first type in the presence of a near-field communication device of a second type, and a second impedance value is selected to communicate with a near-field communication device of the first type in the absence of a near-field communication device of the second type. The presence or the absence of a near-field communication device of the second type is determined based on polling frames transmitted by the antenna.

25 Claims, 6 Drawing Sheets

NFC ACCESSORY DETECTION WITHOUT MAGNETOMETER

CROSS REFERENCE TO RELATED APPLICATIONS

This application claims the priority benefit of French Patent Application No. 2310508, filed on Oct. 2, 2023, entitled "Dispositif NFC", which is hereby incorporated herein by reference to the maximum extent allowable by law.

TECHNICAL FIELD

The present disclosure generally concerns the field of near-field communications, and, more particularly, the association of a mobile device with a plurality of near-field communication devices, some of which may be durably associated with the device.

BACKGROUND

Near-field communication (NFC) systems use a radio frequency electromagnetic field generated by a device (reader) to communicate with another device (card).

A same device may now be a reader, now a card according to the application.

Near-field communications are generally standardized or comply with characteristics set by the actors in the field. For example, the "NFC Forum" sets characteristics with which communication devices comply to exchange with one another, according for example to the application or to the nature of the exchanges (payment, access control, authentication, file exchange, etc.).

To communicate between a device operating in reader mode and a device operating in card emulation mode, the reader generates an electromagnetic field which is loaded with a card located within range. The communication is performed according to various protocols providing modifying the phase and/or the amplitude of a modulation carrier emitted by the reader.

In the targeted applications, the device likely to be associated durably, that is, for a duration longer than that of a usual communication, may be an accessory attached to the mobile device, for example a connected case which displays the time, an electronic wallet, etc. The accessory generally uses the near-field communication mode to have itself recognized (paired or authenticated), in card emulation mode, by the mobile phone operating as a reader but then functionally communicates therewith by means of a link of another nature, for example Bluetooth, Wifi, etc. The fact for the accessory to be in card emulation mode may result, when the mobile phone has to establish another communication in card emulation mode with a distant reader, in the distant reader seeing two "cards" and then rejecting the communication. Such a situation is likely to occur, for example, with a payment terminal which detects two card-type communication devices in its field (the phone and its case).

Systems providing a specific reader or antenna, distinct from the reader or from the antenna for communications in reader/card emulation mode, to communicate with the accessory are known. In these solutions, the accessory has to be disabled during needs of communication of the reader/card emulation mode of the phone with another device than the accessory. The detection of the presence of an accessory is then performed by means of a magnetometer which indicates to the phone microcontroller that the accessory is present, enabling the latter to select the reader or the antenna to be used. As long as the accessory does not need to be used, it is placed in a mode called "mute" where it remains invisible for polling frames from a distant reader, in particular from a reader desiring to communicate when the phone is in card emulation mode. The accessory leaves the "mute" mode by decoding a specific control signal transmitted by the antenna which is dedicated thereto on the phone side. With such a solution, the accessory has to be dedicated to a type of phone to be able to be placed in "mute" mode.

SUMMARY

An embodiment overcomes all or part of the disadvantages of usual devices with a near-field communication device. More particularly, an embodiment aims at avoiding for the presence of durable NFC accessories or devices to disturb the operation of a mobile device fitted with this accessory.

An embodiment provides a mobile device comprising a near-field communication router and an antenna, coupled to the router via at least one impedance matching for selecting between at least two impedance values, wherein: a first impedance value is selected to communicate with a near-field communication device of a first type in the presence of a near-field communication device of a second type, a second impedance value is selected to communicate with a near-field communication device of the first type in the absence of a near-field communication device of the second type, the presence or the absence of a near-field communication device of the second type being determined based on polling frames transmitted by the antenna.

Another embodiment provides a method of near-field communication of a mobile device comprising a near-field communication router and an antenna, coupled to the router via at least one impedance matching circuit for selecting between at least two impedance values, wherein: a first impedance value is selected to communicate with a near-field communication device of a first type in the presence of a near-field communication device of a second type, a second impedance value is selected to communicate with a near-field communication device of the first type in the absence of a near-field communication device of the second type, the presence or the absence of a near-field communication device of the second type being determined based on polling frames transmitted by the antenna.

According to an embodiment, the second type of device corresponds to an accessory of the mobile device.

According to an embodiment, the communication with the first type of device is performed in reader or card emulation mode.

According to an embodiment, an identification of a device of the second type is performed with the mobile device in reader mode.

According to an embodiment, the identification of a device of the second type is performed by a microcontroller of the mobile device, distinct from the router, the microcontroller storing a unique identifier of the device of the second type.

According to an embodiment, if no device of the first or second type is detected during a polling frame, the microcontroller erases any unique identifier of a device of the second type present in the memory.

According to an embodiment, as a result of an identification of an NFC device of the second type, thresholds of a detector in standby mode are recalibrated.

According to an embodiment, if a previously identified NFC device of the second type is no longer detected, thresholds of a detector in standby mode are recalibrated.

According to an embodiment, the antenna comprises two loops electrically in series, respectively intended for devices of the first and of the second type.

According to an embodiment, the loop intended for devices of the second type surrounds or is surrounded by a magnet for aligning the respective antennas of the mobile device and of the device of the second type.

According to an embodiment, the NFC communications between the mobile device and devices of the second type are of type V.

BRIEF DESCRIPTION OF THE DRAWINGS

The foregoing features and advantages, as well as others, will be described in detail in the rest of the disclosure of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for the understanding of the described embodiments have been illustrated and described in detail. In particular, the communication protocols between the different NFC devices have not been detailed, the described embodiments being compatible with usual communication protocols.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., it is referred, unless specified otherwise, to the orientation of the drawings.

Unless specified otherwise, the expressions "about", "approximately", "substantially", and "in the order of" signify plus or minus 10%, preferably of plus or minus 5%.

Figures 1, 2:
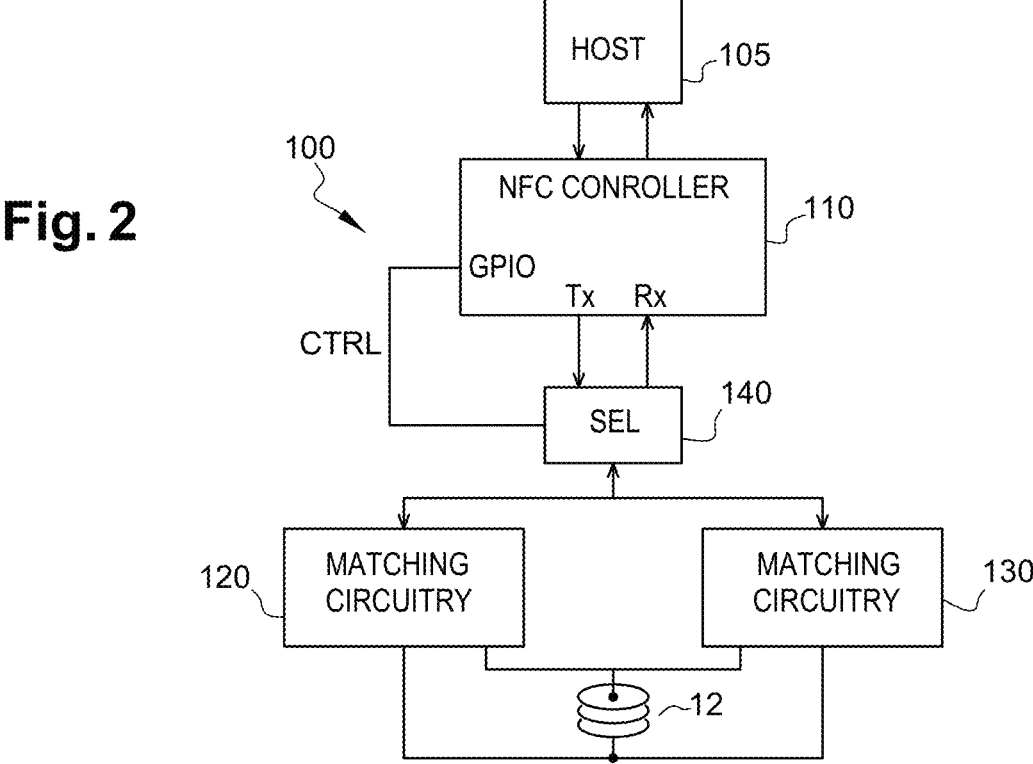
FIG. 1 very schematically shows in the form of blocks an embodiment of a near-field communication system according to a first aspect.
FIG. 2 very schematically and partially shows in the form of blocks an embodiment of a near-field communication device according to the first aspect.

FIG. 1 very schematically shows in the form of blocks an embodiment of a near-field communication system according to a first aspect.

In the rest of the disclosure, a system formed of a mobile phone 1 (DEV1) likely to be associated with an accessory 2 (DEV2) of connected phone case type is considered, but all that will be described more generally applies to any system where a mobile device may be durably associated with a near-field communication device. It may be, for example, an electronic wallet or an element which could be charged by wireless power transfer, for example according to the Qi standard. This element could, before starting the charge, ask for an authentication by means of the NFC technology. This element is for example a connected stylus or a fitness band. Another example is a battery capable charging the phone: before charging the phone by wireless power transfer, this battery is for example authenticated by NFC.

By durable association, there is meant a device likely to remain connected to the phone even outside of NFC communication periods, or even outside of periods of communication over the cellular network and to however exchange with the phone via another channel (for example, Bluetooth).

A connected phone case comprises, for example, a display adapted to communicating with the phone circuits to duplicate certain data, such as for example, the time, a screensaver, etc. Information exchanges are generally performed over a Bluetooth (BT) or Wifi link but a near-field communication (NFC) is used for needs of presence detection and/or of authentication of the case by the phone.

In the context of exchanges between phone 1 and its accessory 2, the phone operates in reader mode and the accessory in card emulation mode.

Phone 1 is further likely to communicate with another device 3 (DEV3) having it located within range. In particular, the phone may need to operate in card emulation mode to exchange with a distant reader, for example a payment terminal or an access control terminal.

Reference will be made hereafter to the example of a payment terminal, but all that will be described more generally applies to any distant device operating in reader mode and with which the device 1 supporting an accessory 2 is likely to communicate in NFC. For simplification, reference will be made to NFC devices to designate electronic devices integrating near-field communication circuits.

According to the first aspect, mobile phone 1 comprises a single antenna NFC 12 which comprises two loops 121 and 123 electrically in series. A first loop 121 is dedicated to NFC communications, in card emulation mode or in reader mode, with a distant device 3 other than an accessory. A second loop 123 is dedicated to NFC communications with accessory 2. Phone 1 is equipped with other usual communication antennas (cellular, WiFi, Bluetooth) and, in particular, with a communication antenna 14, apart from NFC, for example of Bluetooth type, used, among other, for the accessory.

Two terminals of the antenna are coupled to an NFC controller (and possibly to other electronic circuits) forming part of phone 1, symbolized in FIG. 1 by a block 18 (IC).

Preferably, a magnet 16 surrounds or is surrounded by second loop 123. This magnet is used to align this second loop 123 of antenna 12 with an antenna (not shown) of accessory 2.

FIG. 2 very schematically and partially shows in the form of blocks an embodiment of a near-field communication device 100 according to the first aspect.

More particularly, FIG. 2 shows a device 100 of mobile phone 1 according to an embodiment, coupled to antenna 12. Antenna 12 is generally associated with one or a plurality of capacitive elements, not shown (internal and/or external to device 100) to form an oscillating circuit controlled by device 100.

Device 100 comprises various digital and analog electronic circuits depending on its application. For a phone, its NFC device is based on an NFC router (or controller) controlled by a host circuit or microcontroller 105 (HOST). The NFC controller is used as an interface between the digital circuits of the phone and the radio frequency transceiver oscillating circuit. In the considered example, antenna 12 is adapted to communicating with different devices 2 and 3 according to the loop used. For this purpose, device 100 comprises, between NFC controller 110 and the antenna, two impedance matching circuits 120 and 130 and a selector 140 (SEL) to direct the signals to be transmitted Tx or received Rx towards one or the other of circuits 120 and 130 according to the selected operating mode. More particularly, a first impedance matching circuit 120 (MATCHING CIR-CUITRY) is dedicated to the operation in reader mode with accessory 2, and a second impedance matching circuit 130 (MATCHING CIRCUITRY) is dedicated to the operation in reader or card emulation mode with device 3. These circuits 120 and 130 enable to adjust the tuning of the oscillating circuit according to the presence or to the absence of an accessory.

In the example of FIG. 2, an output (Tx) of NFC controller 110 is coupled, preferably connected, to a first terminal of selector 140, an input (Rx) of NFC controller 110 is coupled, preferably connected, to a second terminal of selector 140, an input/output terminal of selector 140 is coupled, preferably connected, to matching circuits 120 and 130, a selector control terminal is coupled to the NFC controller, and antenna 12 is coupled to the two circuits 120 and 130.

For simplification, reference is made, for the NFC controller, to an output Tx for the signals to be transmitted and an input Rx for the received signals but, in practice, differential signals are most often used, a balun, not shown, being present between the antenna and the selector or the impedance matching circuits.

As a variant, selector 140 is integrated to a single impedance matching circuit provided with components adapted to the two impedance matching configurations.

The selection of the impedance values provided by the matching circuits depends on the characteristics of the loops of the antenna so that the oscillating circuit remains tuned, whether the accessory is present or not. These values are determined, for example, at the time of the integration of the circuit in device 100 according to the antenna and to the integration and are, preferably, fixed.

According to this embodiment, a general purpose input/output port (GPIO) of NFC controller 110 transmits to selector 140 a digital control signal (CTRL). Signal CTRL is, preferably, a binary signal having, for example: a high state (or high level) controlling the activation, via selector 140, of matching circuit 120 for an NFC communication, in reader or card emulation mode with a device 3, in the presence of accessory 2; and a low state (or low level) controlling the activation, via selector 140, of the other matching circuit 130 for an NFC communication, in reader or card emulation mode with a device 3 or in reader mode with the accessory, in the absence of accessory 2.

According to the described embodiments, it is provided to use polling frames transmitted by device 100 to detect the presence or the absence of an accessory in front of antenna 12. Indeed, the presence of an accessory loads antenna 12 and requires, for a communication with loop 121 addressed to another NFC device, modifying the impedance matching to keep the tuning.

In practice, a reader, when it is "idle", that is, with no card in its field, is placed in a low power mode, and then periodically generates polling frames to detect a card entering the field of the reader. Once a card has been detected in the field, electronic circuits of the device reader are "woken up" (leave the standby mode) and a communication or transaction with the card can be initiated. The polling frames are generally designated by acronym LPCD (Low Power Card Detection) or LPTD (Low Power Tag Detector).

When a "durable" accessory is detected, it is provided to store its identifier to take into account its presence including when the phone needs exchanging with another device. More particularly, the impedance matching remains in the state determined by circuit 120 as long as the accessory remains present (associated with the phone).

Figure 3:
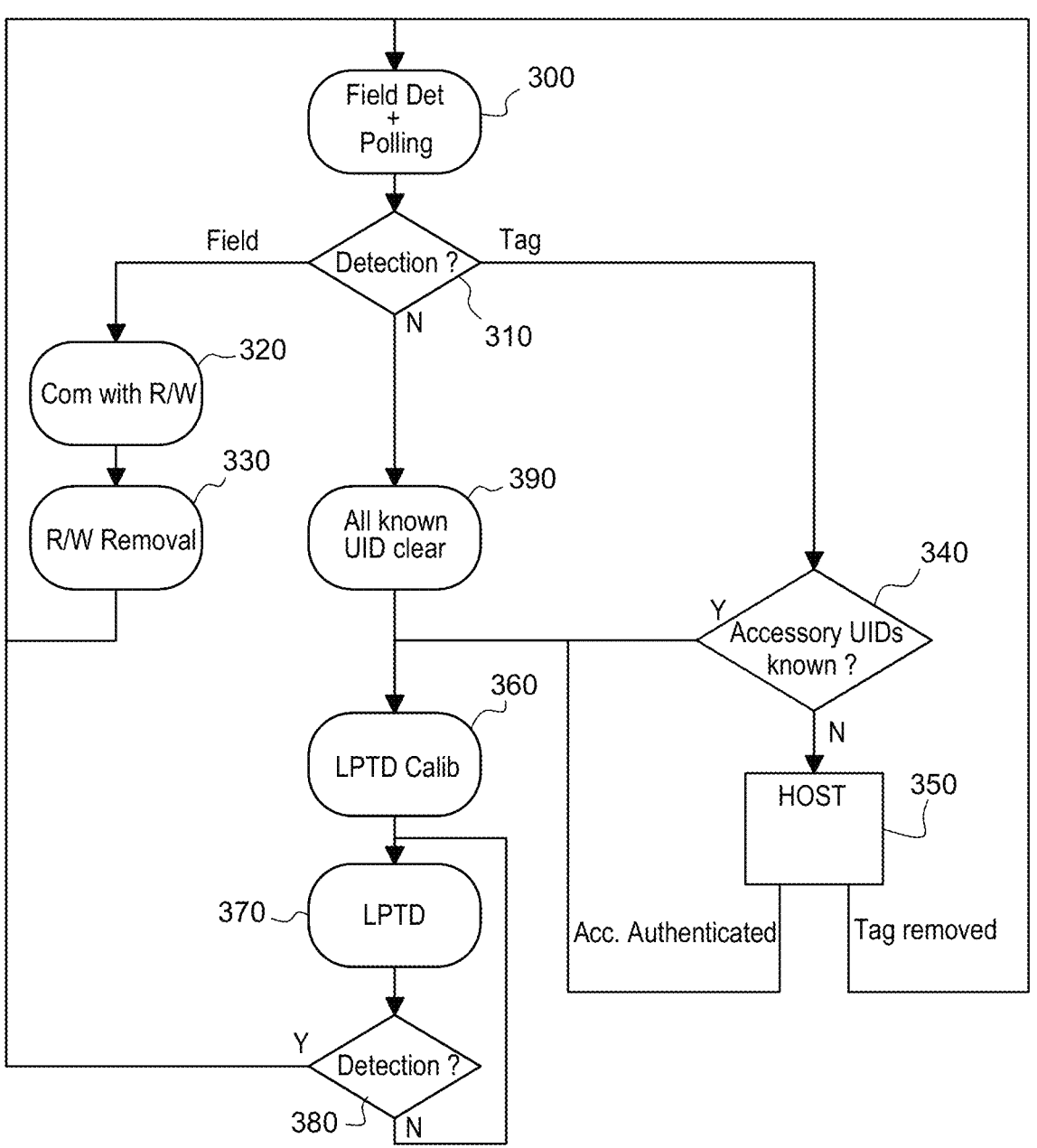
FIG. 3 very schematically shows in the form of blocks an implementation mode of the near-field communication device of FIG. 2.

FIG. 3 very schematically shows in the form of blocks an implementation mode of the near-field communication device of FIG. 2.

Figure 3A:
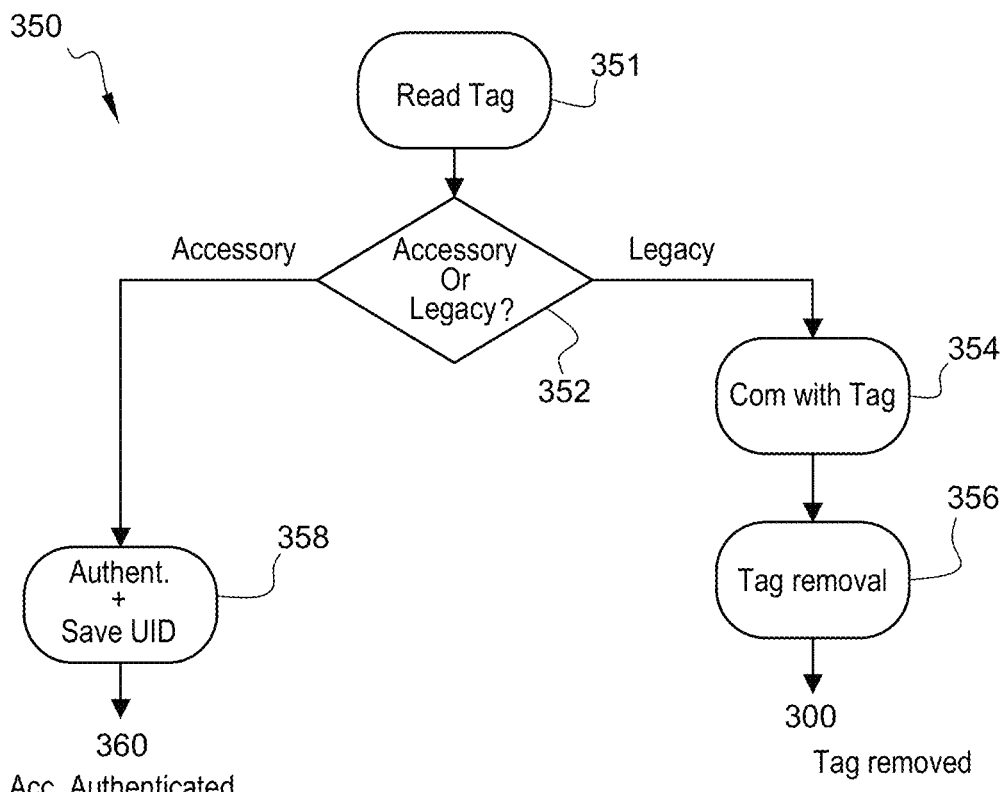
FIG. 3A illustrates, in more detailed fashion, a set of steps of the implementation mode of FIG. 3.

FIG. 3A illustrates, in more detailed fashion, a set of steps of the implementation mode of FIG. 3.

When it is in low power mode, NFC device 1 periodically activates (blocks 300, "Field Det+Polling" and 310, "Detection?") a field detector to detect the presence of a device in reader mode and transmits a radio frequency signal to detect the presence of a device in card emulation mode. During a detection, controller 110 transmits an identification request to obtain the identifier of the device (generally a unique identifier—UID or Unique Identifier).

In the case of a detection of an electromagnetic field (output "Field" of block 310), this means that phone 1 captures an electromagnetic field and is probably in the field of a reader. Mobile phone 1 then behaves in card emulation mode. The phone circuits are woken up to be able to start a communication with a reader NFC device 3 (block 320 "Com with R/W"). A data exchange is then performed in NFC between the phone and the reader. Once the exchange is over (block 330 "R/W removal"), the device returns to standby or low power mode and it is returned to step 300 of field detection and of transmission of polling frames.

In the absence of a detected field at step 300, controller 110 transmits a polling frame to detect whether an electronic tag (NFC device in card emulation mode) is or not present. This detection, usual per se, uses amplitude and/or phase variations of the signal across the oscillating circuit, these parameters being modified in the presence of a card.

In the presence of a card (output "Tag" of block 310), the identifier obtained at step 300 is compared by controller 110 with a potential unique identifier previously stored in the memory (block 340 "Accessory UIDs known?).

When the unique identifier is present in the memory (output Y of block 340), this means that the accessory has already been taken into account (for example that the phone has remained in its case since the previous comparison). It is then considered that the impedance matching is correct and it is returned to the standby mode, if relevant via a calibration phase which will be described hereafter, until the next detection and polling frame (step 300).

When the unique identifier is not present in the memory (output N of block 340), the circuits of the phone and in particular its main processor 105 (HOST) are woken up and the phone communicates with the NFC device to determine whether it is an accessory 2 or an NFC device 3 (351, "Read Tag" and 352, "Accessory or Legacy?", FIG. 3A).

In the case where an NFC device 3 is present (output "Legacy" of block 352), phone 1 behaves in reader mode and NFC device 3 in card emulation mode. The circuits of the phone are woken up to be able to start a communication with NFC device 3 (block 354 "Com with Tag"). A data exchange is then performed in NFC between the card and the reader (the phone). Once the exchange is over (block 356 "Tag removal"), the tag is in practice removed from the phone ("Tag removed") and the device returns to the standby or low power mode and it is returned to step 300 of field detection field and transmission of polling frames.

In the case where step 352 detects that the device present in the field emitted by the phone is an accessory 2 (output "Accessory" of block 352), that is, a device meant to remain durably associated with the mobile phone, the accessory is identified and its identifier is stored (block 358, "Authent.+ Save UID") by the phone microcontroller 105 (HOST). The storage of the identifier will be subsequently used (during subsequent polling frames) at a step 340 to establish whether a device, in card emulation mode, present in the field of device 1, is a new device having entered the field since the previous detection loop or corresponds to an accessory which has remained in the field.

As a result of the storage of a new accessory (output "Acc. Authenticated" of block 105), the device implements a usual calibration process to adjust the amplitude levels to the new environment of the phone. For example, a step (block 360, "LPTD Calib") calibrates the low power mode detection thresholds LPTD to take into account the load formed by the accessory. The low power polling loops then compensate for the presence of the accessory to correctly detect any other NFC device.

Mobile phone 1 then returns to the standby mode while transmitting regular LPTD loops (block 370, "LPTD") as long as no field variation is detected (output N of block 380, "Detection?").

This calibration 360 is also performed if no field and no electronic tag is detected at block 310 (output N of block 310). This may mean that an accessory previously present and recorded is no longer in relation with mobile device 1. Its identifier, which had been recorded on detection thereof, is then erased from the mobile device memory (block 390, "All known UID clear") after which a calibration is performed. If relevant, information is sent to the host circuit 105 (HOST) for a potential notification to the user of the mobile device that the accessory is no longer being detected.

At the end of calibration 360, the mobile phone returns to the standby mode (block 370) and, when a load variation is detected (output Y of block 380), the phone returns to steps 300 and 310 to determine the nature of the NFC device having caused the interference.

When the phone has to communicate with a device 3, it is preferable for accessory 2 not to interfere with the detection of this device 3. For this purpose, accessory 2 should not respond to the phone if the latter is in reader mode, nor to device 3 operating in reader mode, to leave the communication to the phone in card emulation mode.

According to an embodiment, it is then provided to place accessory 2 in "mute" mode where it does not respond to NFC polling frames. Accessory 2 is switched to the mute mode under control of phone 1 which transmits a specific command in NFC only interpretable by accessory 2. When it desires to communicate with the accessory, phone 1 sends to accessory 2 a command for deactivating the mute mode. Such a solution requires the phone and the accessory to be compatible with such an operation. In particular, the phone and the accessory have, in their set of commands, commands required for the switching to and out of the mute mode of the accessory.

According to another embodiment, it is provided for communications between phone 1 and accessory 2 to be performed in a specific type, that is, type V. For example, type V is described in further detail in the ISO/IEC15693 standard. Advantage is then taken from the fact that communications between a phone 1 and another device 3 in reader mode generally use types A or B, in particular for payment and access control applications. Thus, since the accessory does not respond to type-A or type-B requests but only to type-V requests, these applications are not impacted by its presence. Types A, B, and V are defined by the NFC Forum.

Figure 4:
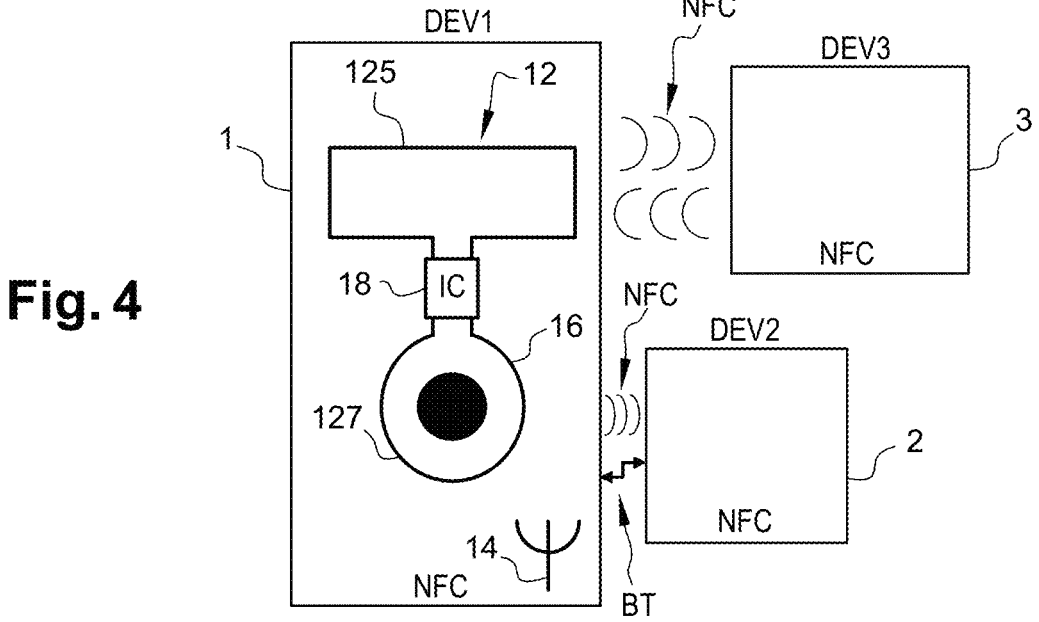
FIG. 4 very schematically shows in the form of blocks an embodiment of a near-field communication system according to a second aspect.

FIG. 4 very schematically shows in the form of blocks an embodiment of a near-field communication system according to a second aspect.

For simplification, only the differences with respect to the embodiment of FIG. 1 will be detailed hereafter, the embodiment of FIG. 4 comprising for the rest the elements of the embodiment of FIG. 1.

According to the second aspect, mobile phone 1 comprises two distinct NFC antennas 125 and 127. A first antenna 125 is dedicated to NFC communications, in card emulation mode or in reader mode, with a distant device 3 other than an accessory 2. A second antenna 127 is dedicated to NFC communications, in reader mode, with accessory 2. In this embodiment, a magnet 16 surrounds or is surrounded by second antenna 127.

As compared with the embodiment of FIG. 1, the difference thus is the use of two antennas rather than two loops of a same antenna.

Figure 5:
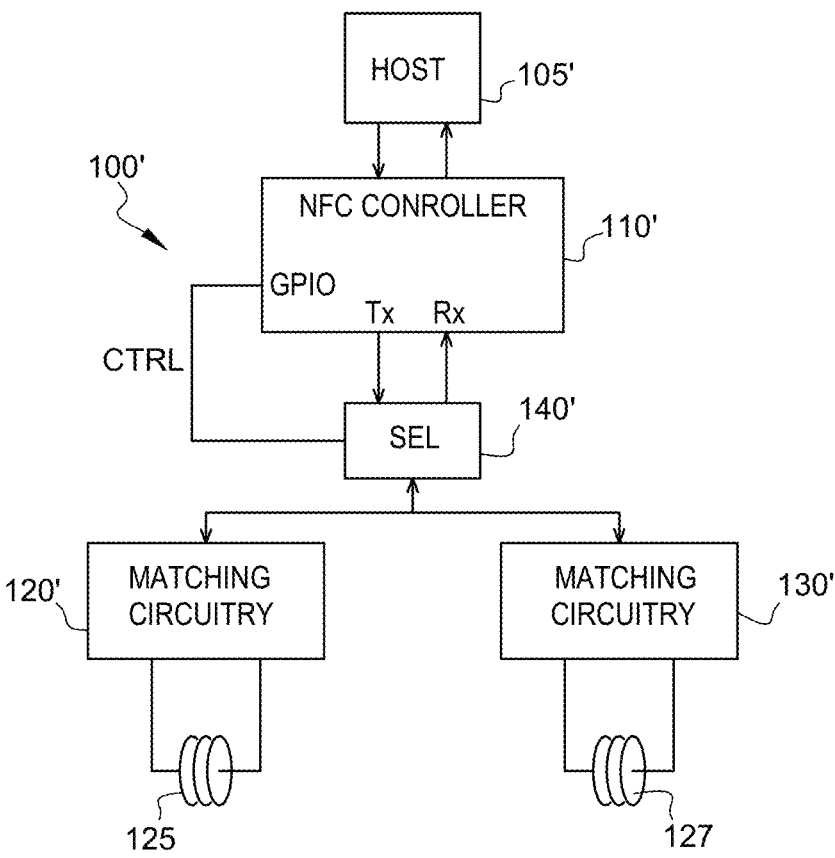
FIG. 5 very schematically and partially shows in the form of blocks an embodiment of a near-field communication device according to the second aspect.

FIG. 5 very schematically and partially shows in the form of blocks an embodiment of a near-field communication device according to the second aspect.

For simplification, only the differences with respect to the embodiment of FIG. 2 will be detailed hereafter, the embodiment of FIG. 5 comprising for the rest the elements of the embodiment of FIG. 2.

NFC device 1 comprises two antennas 125 and 127 which are coupled, preferably connected, to two impedance matching circuits (MATCHING CIRCUIT) 120' and 130' respectively.

In this embodiment, selector 140' (SEL) enables to direct, towards one or the other of antennas 125 and 127, NFC signals to be transmitted by the NFC device 1 comprising circuit 100' according to the distant device 2 or 3 with which mobile phone 1 desires to communicate. Selector 140' is an antenna selector, each antenna being associated with its impedance matching circuit. The selector is coupled, in the same way as in FIG. 2, to NFC controller 110' (NFC CONTROLLER), itself coupled to host circuit 105' (HOST).

Figure 6:
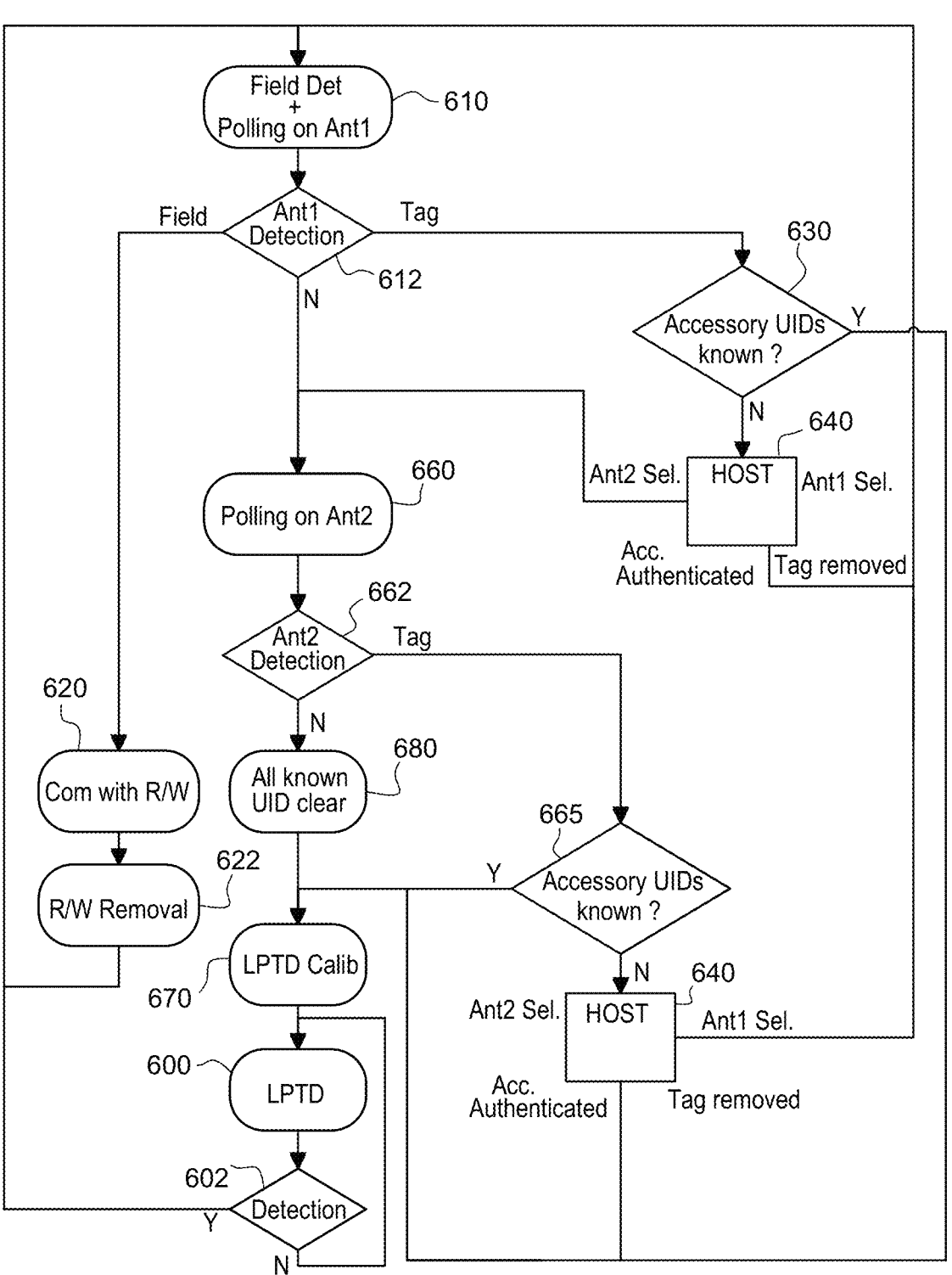
FIG. 6 very schematically shows in the form of blocks an implementation mode of the near-field communication device of FIG. 5.

FIG. 6 very schematically shows in the form of blocks an implementation mode of the near-field communication device of FIG. 5.

Figure 6A:
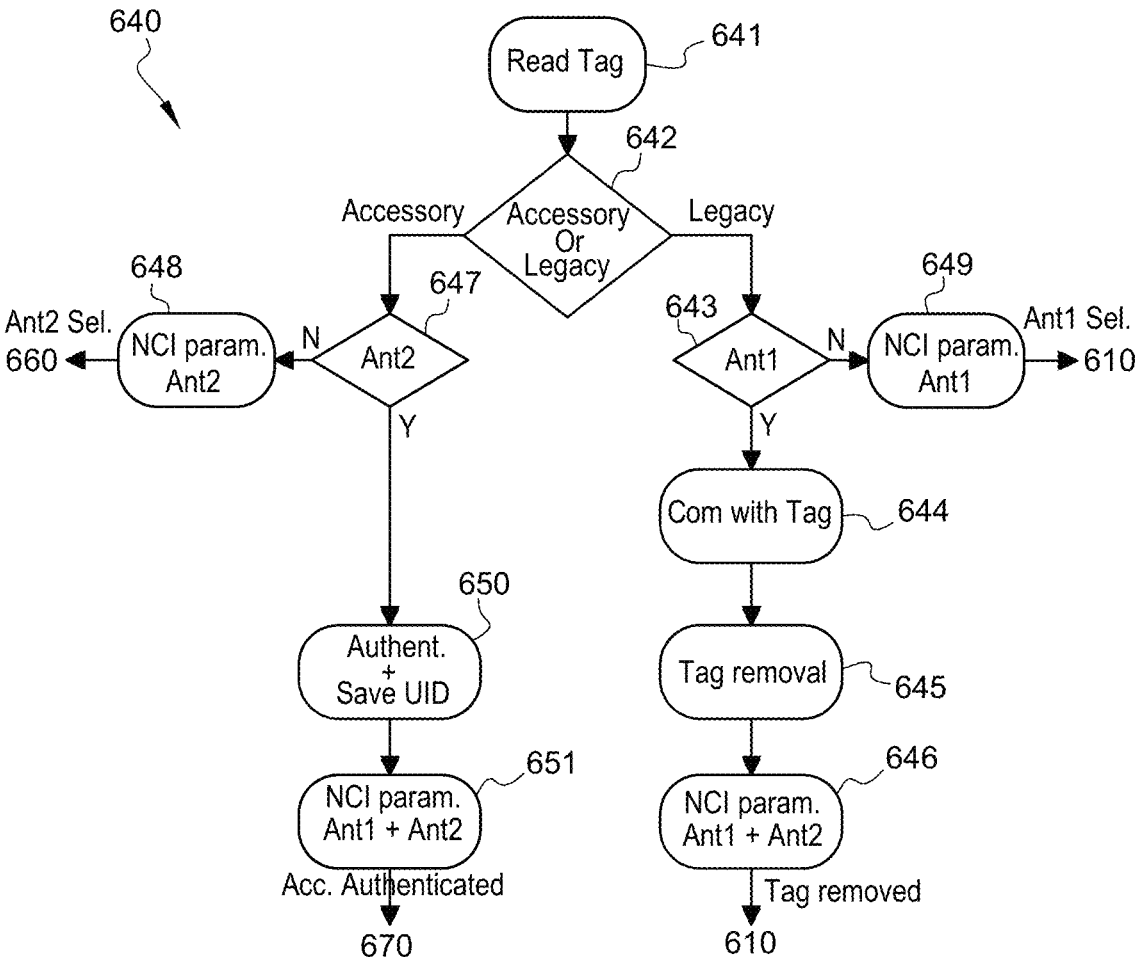
FIG. 6A illustrates, in more detailed fashion, a set of steps of the implementation mode of FIG. 6.

FIG. 6A illustrates, in more detailed fashion, a set of steps of the implementation mode of FIG. 6.

In these drawings, "Ant1" refers to the antenna 125 dedicated to an NFC device 3 and "Ant2" refers to the antenna 127 dedicated to an accessory 2.

When it is in low power or standby mode, NFC device 1 periodically activates (block 600, "LPTD") polling loops on the two antennas 125 and 127 to detect a load variation (block 602, "Detection?) reflecting the arrival or the leaving of an NFC device 2 or 3.

Polling loops 600 are repeated as long as no load variation is detected (output N of block 602).

In the case of a variation detection (output Y of block 602), a field detector for detecting the presence of a device in reader mode is activated and a radio frequency signal for detecting the presence of a device in card emulation mode is transmitted by antenna 125 (blocks 610, "Field Det+Polling on Ant1" and 612, "Ant1 Detection?"). During a detection, controller 110' transmits an identification request to obtain the identifier of the device (generally a unique identifier—UID).

In the case of a detection of an electromagnetic field (output "Field" of block 612), this means that phone 1 captures an electromagnetic field and is probably in the field of a reader. Mobile phone 1 then behaves in card emulation mode. The phone circuits are woken up to be able to start a communication with a reader NFC device 3 (block 620 "Com with R/W"). A data exchange is then performed in NFC between the phone and the reader by means of antenna 125. Once the exchange is over (block 622 "R/W removal"), it is returned to step 610 of field detection and transmission of polling frames onto antenna 125.

In the absence of a detected field at step 610, controller 110' transmits a polling frame on antenna 125 to detect whether an electronic tag (NFC device in card emulation mode) is or not present.

In the presence of a card detected by antenna 125 (output "Tag" of block 612), controller 110' compares its identifier (generally a unique identifier—UID) obtained at step 610 with a previously-stored potential unique identifier (block 630 "Accessory UIDs known?").

If the unique identifier is present in the memory (output Y of block 630), this means that it is an accessory 2 and that it has already been taken into account by antenna 127 (for example that the phone has remained in its case since the previous comparison). It is then considered that the impedance matching is correct and it is returned to the standby mode, if relevant via a calibration phase which will be described hereafter, until the next detection and polling frame (step 610).

If the unique identifier is not present in the memory (output N of block 630), the circuits of the phone and in particular its main processor 105' (HOST) are woken up and the phone communicates with the NFC device to determine whether it is an accessory 2 or an NFC device 3 (641, "Read Tag" and 642, "Accessory or Legacy?", FIG. 6A).

In the case where one of the antennas detects that the device present in the field emitted by the phone is an NFC device 3 (output "Legacy" of block 642), the device has to use antenna 125. It is then verified (block 643, "Ant1?") whether antenna 125 is active. If so (output Y of block 643), phone 1 behaves in reader mode and NFC device 3 behaves in card emulation mode. The phone circuits are woken up to be able to start a communication with NFC device 3 (block 644 "Com with Tag"). A data exchange is then performed in NFC between the card and the reader (phone). Once the exchange is over (block 645 "Tag removal"), the tag is in practice removed from the phone ("Tag removed") and host circuit 105' communicates to NFC controller 110' to select the two antennas (block 646 "NCI param. Ant1+Ant2") for the subsequent polling frames. The method is for example resumed at step 610 to probe for the presence of another NFC device and any addition or removal of an accessory 2 which would have occurred since the last polling frame.

If, at step 642, one of antennas 125, 127 detects that the device present in the field emitted by the phone is an accessory 2 (output "Accessory" of block 642), that is, a device intended to remain durably associated with the mobile phone, the device uses antenna 127. It is then verified (block 647, "Ant2?) whether antenna 127 is active. If not (output N of block 647), host circuit 105' communicates to NFC controller 110' to select antenna 127 (block 648 "NCI param. Ant2").

The selection of antenna 127 ("Ant2 Sel.") for example results in that mobile phone 1 transmits polling frames by means of antenna 127 to detect whether an electronic tag (NFC device in card emulation mode) is or not present (block 660 "Polling on Ant2").

In the presence of a device detected by antenna 127 (output "Tag" of block 662 "Ant2 Detection?"), controller 110' compares its identifier with a previously-stored potential unique identifier of host circuit 105' (block 665 "Accessory UIDs known?").

If the unique identifier is present in the memory (output Y of block 665), this means that it is an accessory 2 already taken into account (for example that the phone has remained in its case since the previous comparison). It is then considered that the impedance matching is correct and it is switched back to the standby mode (block 600 and 602), if relevant via a calibration phase.

If the unique identifier is not present in the memory (output N of block 665), the circuits of the phone and in particular its main processor 105' (HOST) are woken up and the phone communicates with the NFC device, as in the case previously described with antenna 127, to determine whether one is in the presence of an accessory 2 or of an NFC device 3 (blocks 641 and 642, FIG. 6A).

In the case where the tag in the field of antenna 127 is an NFC device 3 (output "Legacy" of block 642), host circuit 105' communicates to NFC controller 110' to select antenna 125, after having verified (block 643, "Ant1?") that antenna 127 is activated (output N of block 643). The selection of antenna 125 (block 649 "NCI param. Ant1") results in that the mobile phone does not carry on the communication with NFC device 3 and returns to step 610 to perform a detection with antenna 125 ("Ant1 Sel.").

In the case where the tag in the field of antenna 127 is an accessory 2 (output "Accessory" of block 642), after having verified (block 647, "Ant2?") that antenna 127 (output Y of block 647) is effectively being used, the accessory is identified and its identifier is stored (block 650, "Authent.+Save UID") by the host microcontroller 105' of the phone. The storage of the identifier will be subsequently used (during subsequent polling frames) at steps 630 and 665 to establish whether a device in card emulation mode present in the field of device 1 is a new device having entered the field since the previous detection loop or correspond to an accessory having remained in the field.

Once the storage has been performed, host circuit 105' communicates to NFC controller 110' to select the two antennas (block 651 "NCI param. Ant1+Ant2") for subsequent polling frames.

At the end of the storage of a new accessory ("Acc. Authenticated"), device 100' implements a usual calibration process (steps 670 corresponding to step 360) to adjust the amplitude levels to the new environment of the phone.

Mobile phone 1 then returns to the standby mode while transmitting constant LPTD loops (block 600) as long as no field variation is detected.

If, during the step 612 of detection by antenna 125, no field nor digital tag is detected (output N of block 612), polling frames are only transmitted by antenna 127 (block 660). If no accessory is detected from the field emitted by antenna 127 (output N of block 662), this means that no accessory is close to mobile device 1. Any identifier, which had been recorded, is then erased from the memory of the mobile device (block 680, "All known UID clear"). If relevant, information is sent to host circuit 105' (HOST) for a potential notification to the user of the mobile device that the accessory is no longer being detected.

The thresholds taken into account by polling loops LPTD are calibrated again (block 670) to take into account the absence of an accessory and the mobile device switches back to standby mode with periodic polling frames (blocks 600 and 602).

In the embodiment of FIGS. 4 to 6A, the impedance matching circuit 120' of antenna 125 may, as in the first aspect, be adjustable between two values according to whether an accessory is or not present. As a variant, the corresponding matching is performed during calibration phases. The same may be provided on the side of circuit 130' although this is less useful since when it is needed to communicate with this antenna, this means that an accessory is present.

As for the embodiments described in relation with the first aspect (FIGS. 1 to 3A), in the embodiments described hereabove in relation with the second aspect (FIGS. 4 to 6A), the possibility for the accessory to be placed in mute mode or for its NFC communications to be in type V is provided.

An advantage of the described embodiments is that they avoid the use of a magnetometer.

Another advantage of the described embodiments using type V for NFC accessory-to-phone communications is that they are compatibles with any accessory without for a specific set of commands to be needed.

Various embodiments and variants have been described. Those skilled in the art will understand that certain features of these various embodiments and variants may be combined, and other variants will occur to those skilled in the art. In particular, each antenna loop may contain one or a plurality of turns. Further, although this has not been specified, the antennas of the applications targeted by the present disclosure are formed of planar windings.

Finally, the practical implementation of the described embodiments and variants is within the abilities of those skilled in the art based on the functional indications given hereabove. In particular, regarding the sizing of the antennas or of the antenna loops.

Other examples of embodiments of the present disclosure are discussed hereafter.

Example 1: a mobile device comprising a near-field communication router (110') and two antennas (125, 127) coupled to the router via a selector (140'), wherein a first antenna (125) is dedicated to a first operating mode with a first type of NFC devices (3), a second antenna (127) is dedicated to a second operating mode with a second type of NFC device (2), and the selection of one antenna or the other being performed as a result of a detection made during polling frames (600) transmitted by one antenna or the other.

Example 2: a method of near-field communication of a mobile device comprising a near-field communication router (110') and two antennas (125, 127) coupled to the router via a selector (140'), wherein a first antenna (125) is dedicated to a first operating mode with a first type of NFC devices (3), a second antenna (127) is dedicated to a second operating mode with a second type of NFC device (2), and the selection of one antenna or the other being performed as a result of a detection performed during polling frames (600) transmitted by one antenna or the other.

Example 3: mobile device according to example 1, or method according to example 2, wherein the second type of device correspond to an accessory (2) of the mobile device (1).

Example 4: mobile device according to example 1 or 3, or method according to example 2 or 3, wherein the communication with the first type of device (3) is performed in reader or card emulation mode with the first antenna (125).

Example 5: mobile device according to any of examples 1, 3 and 4, or method according to any of examples 2 to 4, wherein an identification of a device of the second type is performed with the mobile device in reader mode communicating with the second antenna (127).

Example 6: mobile device or method according to example 5, wherein an identification (650) of a device of the second type (2) is performed by a microcontroller (105') of the mobile device, distinct from router (110'), the microcontroller then stores a unique identifier (650) of the device of the second type.

Example 7: mobile device or method according to example 6, wherein when no device is detected by any of the two antennas during a polling frame, the microcontroller erases any unique identifier (680) of a device of the second type present in the memory.

Example 8: mobile device or method according to any of examples 5 to 7, wherein, as a result of an identification (650) of an NFC device of the second type by second antenna (127), thresholds of a low power detector are recalibrated (670).

Example 9: mobile device according to any of examples 1, 3 to 8, or method according to any of examples 2 to 8, wherein, when a previously identified NFC device of the second type (650) is no longer detected by any of the two antennas during a polling frame, thresholds of a low power detector are recalibrated (670).

Example 10: mobile device according to any of examples 1, 3 to 9, or method according to any of examples 2 to 9, wherein when a device of the second type having an identifier, which has not been stored by the microcontroller, identified (650) by the first antenna (125), the antennas are switched (648) so that the detection is performed on the second antenna (127).

Example 11: mobile device or method according to example 10, wherein the antenna (127) intended for devices of the second type surrounds or is surrounded by a magnet (16) for aligning the respective antennas of the mobile device and of the device of the second type.

Example 12: mobile device according to any of examples 1, 3 to 11, or method according to any of examples 2 to 11, wherein the devices of the second type are of type V.

The invention claimed is:

1. A mobile device comprising:

an antenna;

at least one impedance matching circuit coupled to the antenna; and a near-field communication (NFC) router coupled to the at least one impedance matching circuit, and configured to:

determine a presence or an absence of an NFC device of a second type based on polling frames transmitted by the antenna, the second type durably associable with the mobile device;

control the at least one impedance matching circuit to select a first impedance value to communicate with an NFC device of a first type in the presence of the NFC device of the second type, wherein the NFC device of the first type and the NFC device of the second type are different devices; and control the at least one impedance matching circuit to select a second impedance value to communicate with the NFC device of the first type in the absence of the NFC device of the second type.

2. The mobile device according to claim 1, wherein the NFC device of the second type corresponds to an accessory of the mobile device.

3. The mobile device according to claim 1, wherein the mobile device is configured to communicate with the NFC device of the first type while in reader or card emulation mode.

4. The mobile device according to claim 1, wherein the mobile device is configured to determine an identification of the NFC device of the second type while in reader mode.

5. The mobile device according to claim 4, wherein the mobile device comprises a memory and a microcontroller configured to determine the identification of the NFC device of the second type, wherein the microcontroller is distinct from the NFC router, and wherein the microcontroller is configured to store a unique identifier of the NFC device of the second type in the memory.

6. The mobile device according to claim 5, wherein, in response to no NFC device of the first or second type being detected during a polling frame, the microcontroller is configured to erase any unique identifier of the NFC device of the second type present in the memory.

7. The mobile device according to claim 4, wherein, in response to the identification of the NFC device of the second type, the mobile device is configured to recalibrate thresholds of a detector in standby mode.

8. The mobile device according to claim 1, wherein, in response to a previously-identified NFC device of the second type no longer being detected, the mobile device is configured to recalibrate thresholds of a detector in standby mode.

9. The mobile device according to claim 1, wherein the antenna comprises two loops electrically in series, respectively intended for NFC devices of the first type and of the second type.

10. The mobile device according to claim 9, wherein the loop intended for the NFC devices of the second type surrounds or is surrounded by a magnet configured to align the antenna of the mobile device and a second antenna of the NFC device of the second type.

11. The mobile device according to claim 1, wherein the NFC communications between the mobile device and the NFC device of the second type are of type V.

12. A system comprising:
    the mobile device according to claim 1;
    the NFC device of the first type; and
    the NFC device of the second type.

13. A method of near-field communication (NFC) of a mobile device comprising an NFC router, an antenna, and at least one impedance matching circuit coupling the NFC router and the antenna, the method comprising:

determining a presence of an NFC device of a second type based on first polling frames transmitted by the antenna, the second type durably associable with the mobile device;

selecting a first impedance value to communicate with an NFC device of a first type in the presence of the NFC device of the second type, the NFC device of the first type and the NFC device of the second type being different devices;

determining an absence of the NFC device of the second type based on second polling frames transmitted by the antenna; and selecting a second impedance value to communicate with the NFC device of the first type in the absence of the NFC device of the second type.

14. The method according to claim 13, wherein the NFC device of the second type corresponds to an accessory of the mobile device.

15. The method according to claim 13, further comprising communicating with the NFC device of the first type with the mobile device in reader or card emulation mode.

16. The method according to claim 13, further comprising identifying the NFC device of the second type with the mobile device in reader mode.

17. The method according to claim 16, further comprising:
    performing, by a microcontroller, distinct from the NFC router, of the mobile device, the identifying the NFC device of the second type; and
    storing, by the microcontroller, a unique identifier of the NFC device of the second type.

18. The method according to claim 17, further comprising, in response to no NFC device of the first or second type being detected during a third polling frame, erasing, by the microcontroller, any unique identifier of the NFC device of the second type present in a memory of the mobile device.

19. The method according to claim 16, further comprising, in response to identifying the NFC device of the second type, recalibrating thresholds of a detector in standby mode.

20. The method according to claim 13, further comprising, in response to a previously-identified NFC device of the second type no longer being detected, recalibrating thresholds of a detector in standby mode.

21. The method according to claim 13, wherein the antenna comprises two loops electrically in series, respectively intended for NFC devices of the first type and of the second type.

22. The method according to claim 21, wherein the loop intended for the NFC devices of the second type surrounds or is surrounded by a magnet, and the method further comprises aligning, by the magnet, the respective antennas of the mobile device and of the NFC device of the second type.

23. The method according to claim 13, wherein the NFC communications between the mobile device and the NFC device of the second type are of type V.

24. A system comprising:
    a mobile device comprising:
        an antenna;
        at least one impedance matching circuit coupled to the antenna; and
        a near-field communication (NFC) router coupled to the at least one impedance matching circuit, and configured to:

determine a presence or an absence of an NFC device of a second type based on polling frames transmitted by the antenna, the second type durably associable with the mobile device;

control the at least one impedance matching circuit to select a first impedance value to communicate with an NFC device of a first type in the presence of the NFC device of the second type, wherein the NFC device of the first type and the NFC device of the second type are different devices; and control the at least one impedance matching circuit to select a second impedance value to communicate with the NFC device of the first type in the absence of the NFC device of the second type;

the NFC device of the first type; and the NFC device of the second type.

25. The system according to claim 24, wherein the NFC device of the second type is an accessory of the mobile device.

* * * * *